Jan. 20, 1925.
W. H. LAMB
1,523,882
HEADLIGHT FOR AUTOMOBILES
Filed Nov. 3, 1923
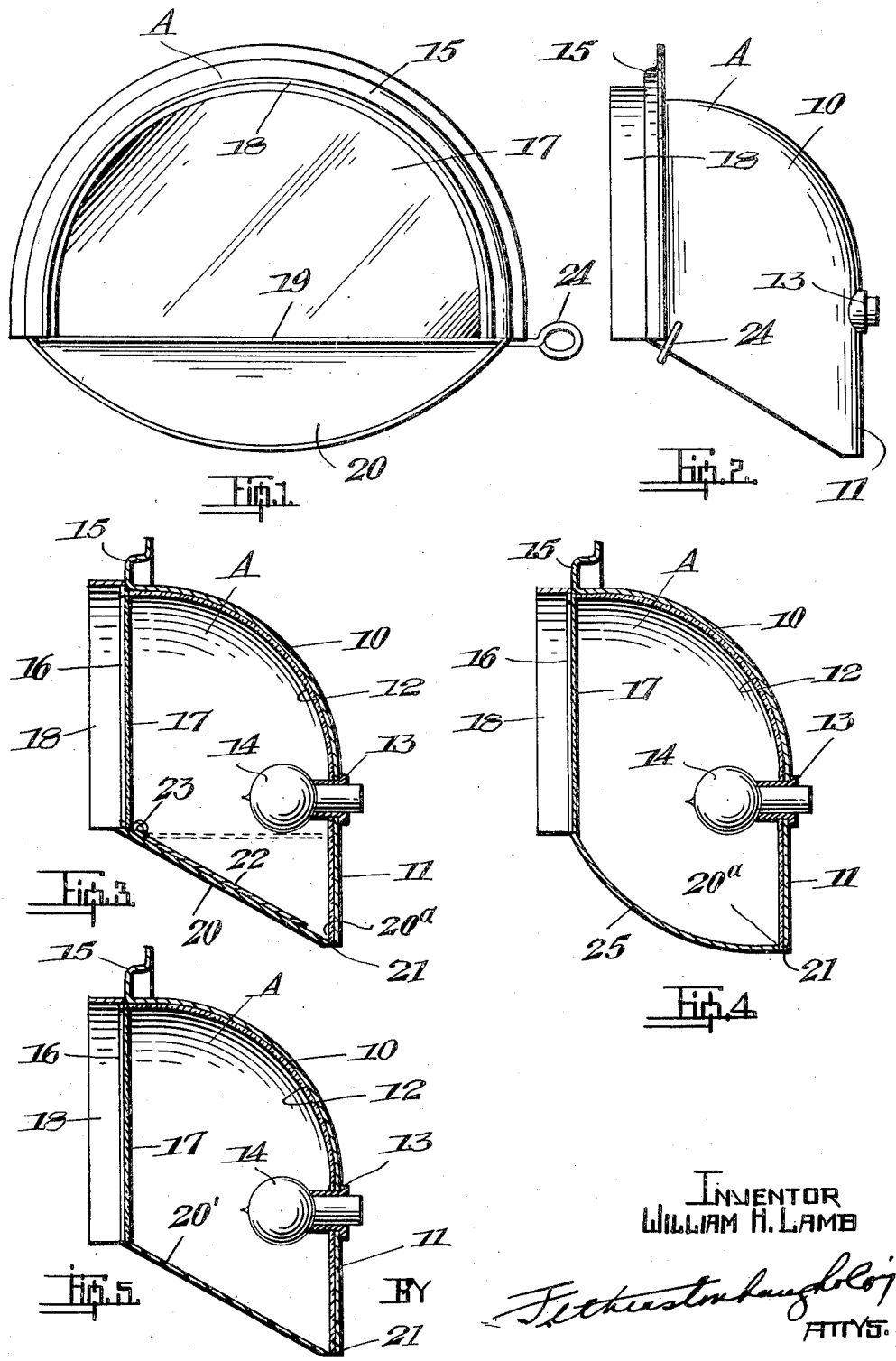
INVENTOR
WILLIAM H. LAMB Patented Jan. 20, 1925.

1,523,882

UNITED STATES PATENT OFFICE.

WILLIAM HERBERT LAMB. OF BUCKINGHAM, QUEBEC, CANADA.

HEADLIGHT FOR AUTOMOBILES

Application filed November 3, 1923. Serial No. 672,620.

*To all whom it may concern:*

Be it known that I, WILLIAM HERBERT LAMB, a subject of the King of Great Britain, and resident of Buckingham, in the Province of Quebec, Dominion of Canada, have invented certain new and useful Improvements in Headlights for Automobiles, of which the following is a specification.

This invention relates to headlights for automobiles, and more especially to the provision of reflectors therein designed to prevent the glare of the powerful headlights used on automobiles, and which blinds the chauffeur of a car coming in the opposite direction from the car equipped with these lights.

It is an object of the invention to provide a means to prevent this glaring and at the same time allow the car operator to take advantage of a powerful light.

Still further objects are to provide a means whereby the angle of reflection of light may be varied at will.

Still further objects are to provide a means whereby the rays of light may be crossed and dipped.

Still further objects are to provide an improved headlight that is simple in construction, not liable to go out of repair, and generally to adapt the several parts to better perform the functions required of them.

With the above and other objects in view, the invention consists essentially of the improved construction, hereinafter described in detail in the accompanying specification and drawings.

Referring to the drawings:—

Figure 1 is a front elevation of an automobile headlight embodying the invention.

Figure 2 is a side elevation of the embodiment shown in Figure 1.

Figure 3 is a cross section of the same.

Figure 4 is a cross section taken through a different embodiment of the invention.

Figure 5 is a cross section taken through a further embodiment of the invention.

Referring to the preferred form of invention illustrated in Figures 1 to 3 inclusive, reference character 9 designates a headlight casing formed with an inclined top wall 10 curving upwardly and forwardly from the upper edge of the vertically disposed rear wall 11. The flat bottom wall 20 is inclined upwardly and outwardly from the lower edge of the rear wall 11 to form therewith the acute angle designated 20ª.

This disposition of the bottom wall 20 at an acute angle to the inner plane surface of the rear wall 11 is a very important feature of the invention, as it results in "dipping" of the light rays projected from the casing in such manner as to eliminate objectional glaring effect. It is explained, in this connection, that the rays of light passing from the lamp 14 toward the bottom wall 20 are reflected vertically by means of the adjustable reflector plate 22 onto the curved portion 10 which serves to reflect the light rays downwardly through the semicircular lens 17 which closes the front of the casing and extends from the front edge of the bottom wall 20 to the corresponding edge of the top wall 10.

The front portion of the casing 9 is flanged, as indicated at 15 and is provided, inwardly of said flange, with a channel 16 seating the curved upper and side edges of the lens 17, the lower straight edge 19 of which is soldered or otherwise secured to the front edge of the wall 20. I also prefer to provide the casing with an arcuate cross reflector 18 following the curved edge of lens 17 and projecting outwardly therefrom as shown in Figure 2.

The reflector 22 is normally disposed to rest flatly upon the bottom wall 20 but is capable of pivotal adjustment in a vertical direction by reason of its mounting on the spindle 23 which is suitably journaled to extend along the edge 19 of the lens 17 and has one of its ends protruding beyond the casing 9 and looped to provide an operating handle 24.

As previously explained the reflector 22, acting in conjunction with the curved top wall 10, causes the rays of light to be projected downwardly through the lens 17 and it will now be apparent that by adjusting the angle of plate 22 through the medium of handle 24 it is possible to predetermine the distance in front of the car to which the light rays are projected.

The casing 9 is further shown as provided with a socket 13 for the lamp 14 and with suitable reflecting surfaces 12 lining the walls 10 and 11.

In the modified form of invention disclosed in Figure 4 the reflector plate 22 is omitted and the inclined bottom wall 25 is formed with an arcuate or concave reflecting surface in lieu of the plane surface of the preferred form.

Figure 5 shows a further modification according to which the reflector plate 22 is omitted and the flat inclined wall 20 provided with a burnished or other suitable reflecting surface.

From the foregoing it will be apparent that an extremely powerful lamp may be used in the head light casing of my invention without objectional glaring effect due, particularly, to the fact that the design and relative disposal of the reflecting surfaces is such as to cause all light rays to be projected downwardly through the lens.

Although I have disclosed what I now consider to be the preferred forms of the invention, it will be apparent that various changes may be resorted to within the scope of the appended claim and hence it is intended that all matter contained in the present specification and drawings shall be interpreted as illustrative and not in a limiting sense.

What I claim as my invention is:

In a head light, a reflector comprising a casing presenting a plane vertically extending reflecting surface, a top reflecting surface curving upwardly and forwardly from the upper edge of the vertical surface and to a point of appreciable elevation in advance of said vertical surface, a bottom surface in the form of a flat plane inclining upwardly and forwardly from the lower edge of the vertical surface, a lamp mounted in front of said vertical surface, a movable reflecting plate normally disposed to lie flat upon said bottom surface, a shaft pivotally mounting the upper forward edge of said reflecting plate and means whereby said shaft may be operated to adjust the free edge of the reflecting plate in a vertical direction.

In witness whereof I have hereunto set my hand in the presence of two witnesses.

WILLIAM HERBERT LAMB.

Witnesses:
W. T. CUFF QUIN,
WM. A. WYMAN.